(12) United States Patent
Bowe et al.

(10) Patent No.: US 9,327,641 B1
(45) Date of Patent: May 3, 2016

(54) MOUNTING BASE

(71) Applicants: Delores Tasneen Bowe, Ann Arbor, MI (US); Peter Ellis Hackett, Belleville, MI (US)

(72) Inventors: Delores Tasneen Bowe, Ann Arbor, MI (US); Peter Ellis Hackett, Belleville, MI (US)

( * ) Notice: Subject to any disclaimer, the term of this patent is extended or adjusted under 35 U.S.C. 154(b) by 0 days.

(21) Appl. No.: 14/658,053

(22) Filed: Mar. 13, 2015

(51) Int. Cl.
*B60Q 1/00* (2006.01)
*B60Q 1/26* (2006.01)
*B60R 13/00* (2006.01)

(52) U.S. Cl.
CPC ............ *B60Q 1/2615* (2013.01); *B60Q 1/2611* (2013.01); *B60R 13/00* (2013.01)

(58) Field of Classification Search
CPC ..... B60Q 1/2611; B60Q 1/2615; B60R 13/00
See application file for complete search history.

(56) References Cited

U.S. PATENT DOCUMENTS

| | | | | |
|---|---|---|---|---|
| 5,491,621 A * | 2/1996 | Duty | ...................... | F21V 19/009 362/396 |
| 2006/0273121 A1* | 12/2006 | Thomas | .................. | B60R 9/058 224/322 |
| 2007/0153537 A1* | 7/2007 | Scott | ........................ | B60Q 1/26 362/503 |

* cited by examiner

*Primary Examiner* — Thomas M Sember
(74) *Attorney, Agent, or Firm* — Thomas P. Heed

(57) ABSTRACT

A vehicle-roof mounting-base, for supporting sign or light elements, that uses vacuum evacuation to adhere the vehicle-roof mounting-base to a vehicle roof. The vacuum evacuation is accomplished by using a continuous, gas impermeable seal between the lower surface of the vehicle-roof mounting-base and the vehicle roof. A vacuum pump then partially evacuates the volume enclosed by the continuous seal, the vehicle roof, and the lower surface of the vehicle-roof mounting-base, providing sufficient retention force to hold the vehicle-roof mounting-base to the vehicle roof.

14 Claims, 5 Drawing Sheets

MOUNTING BASE

FIELD OF INVENTION

This invention relates to the classes Illumination; and Card, Picture, or Sign Exhibiting. Specifically, this invention relates to the classes and sub-classes for mounting a sign or light on the roof of a vehicle or other flat surface.

BACKGROUND OF INVENTION

The Ford F-Series pick-up truck is the largest selling single vehicle line in North America, and it comes with substantial externalities. Estimates are that the F-150, alone, will account for over 700,000 units sold in 2015. Over $15 Billion in F-Series trucks are sold annually. The F-150 is used not only as a personal vehicle, but also as a work vehicle, for literally, millions of Americans. Additionally, many F-150 pick-up trucks are used by utilities, municipalities, and emergency services.

Through the 2014 model year, the F-150 has used a traditional steel construction: steel frame, steel body structure, and steel box. The steel construction allows workers, utilities, municipalities, and emergency services to mount a wide variety of signs and lights to the roof of the F-150. Many of these signs and lights are mounted only temporarily, using high-powered magnets.

In 2014, the variants of the F-150 achieved EPA combined mileage varying from a low of 13 miles per gallon for the Raptor (4WD, V8) to a high of 18 miles per gallon for the base model (2WD, V6). In 2014, the Corporate Average Fuel Economy ("CAFE") Standard for an F-150 was 23 miles per gallon. The CAFE Standard for cars and light trucks are going to be continually increased at a rate of 5% per year, until 2025. By 2025, the CAFE Standard for a combined maker's fleet is supposed to be over 50 miles per gallons. By 2025, the CAFE Standard for a full-size pick-up truck the size of the 2014 F-150 will be 30 miles per gallon. Failure to reach the CAFE Standard results in a per vehicle penalty to the automaker. The penalty can be quite substantial.

The CAFE Standard increase was a response to the externalities of petroleum. Petroleum causes pollution, comes from unreliable sources, and varies, substantially, in price. The pollution from burning fossil fuels, such as petroleum, makes the air in many major cities, such as Mexico City, Beijing, and Los Angeles, unhealthy to breathe for many people. In the U.S., much of the country has been designated an Ozone Attainment Area, and need to use a special formulation of gasoline during the summer to reduce ozone. Drilling for petroleum is also fraught with hazard. Witness the BP drilling catastrophe in the Gulf of Mexico in 2010 or the grounding of the Exxon Valdez in 1989. The sales of petroleum give undue influence to the governments who control exportable quantities of the resource, such as Russia, Venezuela, and Saudi Arabia. Petroleum is becoming increasingly scarce, meaning that the price is rising, generally, and is subject to wide and unpredictable swings in price. This has led to volatility in the oil markets, with the cost of a barrel of oil spiking at $140 per barrel in 2008, as global demand peaked; and falling to a low of $55 per barrel in early 2015, as global demand softened. It is expected that the price will quickly rise as economic activity in the BRIC countries (Brazil, Russia, India, and China) rebound from slower growth.

In order to address the challenges posed by the new CAFE Standards, starting in 2015, Ford will use aluminum alloys in the body of the F-150 to shave off as much as 700 pounds of weight. Ford promises that the new F-150 will be a "segment changer," substantially improving the overall fuel efficiency of a pick-up truck without sacrificing power or towing capacity. In 2015, it is estimated that the new, aluminum, F-150 pick-up truck will surpass the volume of all aluminum-intensive cars and light trucks built to date.

The 2015 F-150 frame is still made from steel. However, the body and underlying structure are almost entirely 5000/6000 series aluminum alloy. Ford developed a proprietary method of heat treating that increases bend resistance. The cab's structural cage is hydro-formed aluminum. Glue and rivets are used to join the aluminum, rather than welds.

As a result of the 2015 Ford F-150's body, temporary signs and lights, those using magnets, will no longer work. Aluminum is a non-ferrous metal, and the magnets will not stick to it. This is an unintended consequence of Ford's decision to go to an aluminum body. The market has not, yet, addressed this concern.

REVIEW OF THE PRIOR ART

The current prior art has not established a suitable, temporary mounting base to be used on the roof of aluminum-body vehicles. The prior art discloses many examples of signs and lights that are permanently mounted to vehicle roofs, such as U.S. Pat. No. 8,425,098 (mechanically attached lightbar with GPS capability); U.S. Pat. No. 7,387,414 (through-hole mounted lightbar); U.S. Pat. No. 5,931,573 (permanently mounted lightbar that pivots); U.S. Pat. No. 5,558,424 (permanently mounted lightbar that can be raised); U.S. Pat. No. 4,839,975 (vehicle topper sign). Such inventions, by their very nature, are not capable of being temporarily mounted and easily removed from a vehicle roof.

The prior art discloses many examples of signs and lights that are temporarily or permanently mounted to vehicle roofs using straps or mechanical clamps, such as U.S. Pat. No. 7,244,053 (lightbar with mounting using feet and straps on a roof ridge); U.S. Pat. No. 5,132,666 (variation of triangular topper sign with c-hooks and straps for mounting); and U.S. Pat. No. 4,787,163 (variation of triangular topper sign with c-hooks and straps for mounting). Two problems arise with using straps and hooks to temporarily mount a light or a sign to a vehicle roof: (1) the mount only works if the roof has to have a suitable ridge; and (2) the mount is time-consuming and difficult to put-on and take-off the vehicle.

The prior art discloses many examples of signs and lights that are temporarily mounted to vehicle roofs using magnets, such as U.S. Pat. No. 6,082,880 (topper sign for funeral procession temporarily mounted with magnets); U.S. Pat. No. 5,711,100 (topper sign with magnets that can pivot to fit the contour of the vehicle roof, intended for temporary mounting); and U.S. Pat. No. 4,574,726 (mast with distress sign temporarily mounted with magnets). Clearly, magnetic mounts will not work with an aluminum-bodied vehicle.

The prior art discloses many examples of signs and lights that are temporarily mounted to vehicle roofs using suction cups, such as U.S. Pat. No. 7,347,018, U.S. Pat. No. 7,213,356, U.S. Pat. No. 7,069,679, and U.S. Pat. No. 6,892,486 (a family of patents for attaching a banner to a vehicle roof using suction cups). U.S. Pat. No. 3,936,967 discloses a sign that can be affixed to a stationary car. US utility patent application publication number 20060273121 ("Application '121") discloses a lightbar held in place with suction cups. Application '121 was abandoned, presumably because the inventor discovered that mere suction cups are not suitable to temporarily affix a lightbar to a moving vehicle.

The only prior art that discloses using a vacuum with respect to a light or a sign does not involve a vehicle and does not involve a mounting base: U.S. Pat. No. 4,183,160 discloses a display case that uses a patent to hold a document flat against the display glass ("Patent '160"). The display case in Patent '160 is not in motion, and the display case in Patent '160 is not affixed to a surface. As such, Patent '160 does not teach anything that is really germane to a discussion of the prior art for the present invention. Clearly, with the advent of the new, aluminum F-150, the market needs a non-permanent method to affix a sign or light arrangement to an aluminum vehicle roof, and the prior art neither discloses nor anticipates such a device.

SUMMARY OF THE INVENTION

The present invention improves and expands on the prior art. The present invention uses a vacuum seal to temporarily affix a mounting base to the roof of a vehicle. The mounting base can be used as a platform for either lights or signs, which are intended to be temporarily mounted on non-ferrous mounting surface, such as an aluminum roof.

The present invention has a base, a seal, a vacuum pump, a hose, a nozzle, a vacuum sensor, case, and a power cable ("assembly"). The base is a rigid platform made from a stiff, environmentally durable material such as poly(methyl-methacrylate) ("PMMA" or tradenames Plexiglass or Lucite®), polycarbonate ("PC" or tradename Lexan®), acrylonitrile butadiene styrene ("ABS"), steel, or aluminum. The case encloses the vacuum pump, hose, nozzle, vacuum sensor, and the various wires and hardware associated with each. The case is connected to the base with a durable fastener, such as a rivet or screw. Typically, the case is made from a durable polymer such as ABS, polypropylene ("PP"), PMMA, PC, high-density polyethylene ("HDPE"), or low-density polyethylene ("LDPE"). In lighting applications, the case can be made out of PC, PMMA, or other clear or semi-transparent plastic.

A continuous gas impermeable seal forms an enclosed volume defined by the bottom of the base, the top of the roof, and the seal, itself. For the purposes of this patent, retention pressure will be defined as a positive quantity. The retention pressure will be less than atmospheric pressure, but more than absolute zero pressure. When the vacuum pump is on, the hose and nozzle evacuate air from the enclosed volume, creating a vacuum seal. The vacuum sensor shuts off the vacuum pump when the enclosed volume pressure falls below the pre-defined retention pressure. The vacuum sensor turns on the vacuum pump if enough air leaks out of the enclosed volume, so that the pressure within the enclosed volume rises above the pre-defined retention pressure. The vacuum sensor can be either a low-cost differential pressure sensor, and the associated circuitry, or a pressure switch calibrated to close when the pressure in the enclosed volume exceeds the pre-defined retention pressure. The retention pressure for a particular assembly design will be proportional to a retention force.

The seal is fabricated from a gas-impermeable material, such as silicon, butyl rubber, nitrile rubber, or closed-cell foam. The seal can also be of compound construction, in which the upper part of the seal (the part in contact with the base) is made from a durable material, such as ABS, PP, PMMA, PC, HDPE, LDPE, steel, or aluminum. The lower part of a compound seal is made of silicon, butyl rubber, nitrile rubber, closed-cell foam, or similar gas impermeable sealing material. A compound seal is used to contour the seal to more nearly match a particular roof application, or to create a larger stand-off between the roof and the base, thus enclosing a larger volume. The seal is permanently attached to the base. The seal may be attached to the base using an adhesive, welding, or other gas impermeable attaching means. The seal dimensions depend on the application and the material. For roofs that have ridges or drainage channels, a sealing material that quickly and easily forms to contours, such as silicon, should be used.

The vacuum hose is made from standard flexible automotive vacuum hose materials such as neoprene, silicon, HDPE, LDPE, and flex steel. The vacuum hose connects the vacuum pump to the vacuum nozzle. The vacuum nozzle is either one-way gas valve, which allows air to be sucked out of the enclosed volume, but does not allow air to infiltrate the enclosed volume through the nozzle, or an aperture fitting allowing the free flow of gas in both directions.

The vacuum pump is mounted to the base. The vacuum pump can either be directly attached to the nozzle, or it can be attached to the nozzle through a vacuum hose. The nozzle allows the vacuum to evacuate the enclosed volume by removing air (i.e., reducing pressure). The vacuum pump is a traditional constant displacement pump that exhausts to atmospheric pressure. The constant displacement pump can be of any construction, but inexpensive dry displacement pumps are preferred. Examples of an inexpensive, dry displacement pump would be one of rotary vane, or diaphragm construction.

The present invention will remain in place on the roof of a moving vehicle as long as the coefficient of static friction, between the seal and the roof, multiplied by the normal force of the base on the vehicle roof exceeds the inertial force of the mounting-base due to vehicle acceleration plus the force due to wind resistance. The normal force is the force due to gravity of the assembly (base, seal, case, vacuum pump, hose, nozzle, actuator, and wires), plus the retention force created within the enclosed volume by the vacuum pump. The relationship, generally, can be given by the equation $$\mu_s(F_R+F_G) > F_i+F_w \tag{1}$$

where $\mu_s$ is the coefficient of static friction between the seal and the roof; $F_R$ is the retention force, normal to the roof surface, due to reduced pressure in the enclosed volume; $F_G$ is the force of gravity of the assembly; $F_i$ is the force of inertia of the assembly under maximum vehicle acceleration; and $F_w$ is the wind resistance. The force of inertia is proportional to the acceleration of the vehicle. The force of wind resistance is proportional to the square of the velocity of the vehicle. Considerations such as the maximum cross wind, the cross-sectional size of the assembly, the effect of roof grime on the coefficient of friction, and the relationship between velocity and acceleration for applicable vehicles are left to the skilled mechanic to experimentally determine. The key to success is that the retention force must be high enough that equation (1) is always true.

BRIEF DESCRIPTION OF THE DRAWINGS

The present invention, a vehicle-roof mounting-base, is illustrated with five drawings.

DETAILED DESCRIPTION

The following descriptions are not meant to limit the invention, but rather to add to the summary of invention, and illustrate the vehicle-roof mounting-base using evacuation with a vacuum. The present invention can be used as a mounting base for signs, lightbars, emergency lights, spot lights, and lighted signs. The present invention is the mounting base, itself.

Figure 1:
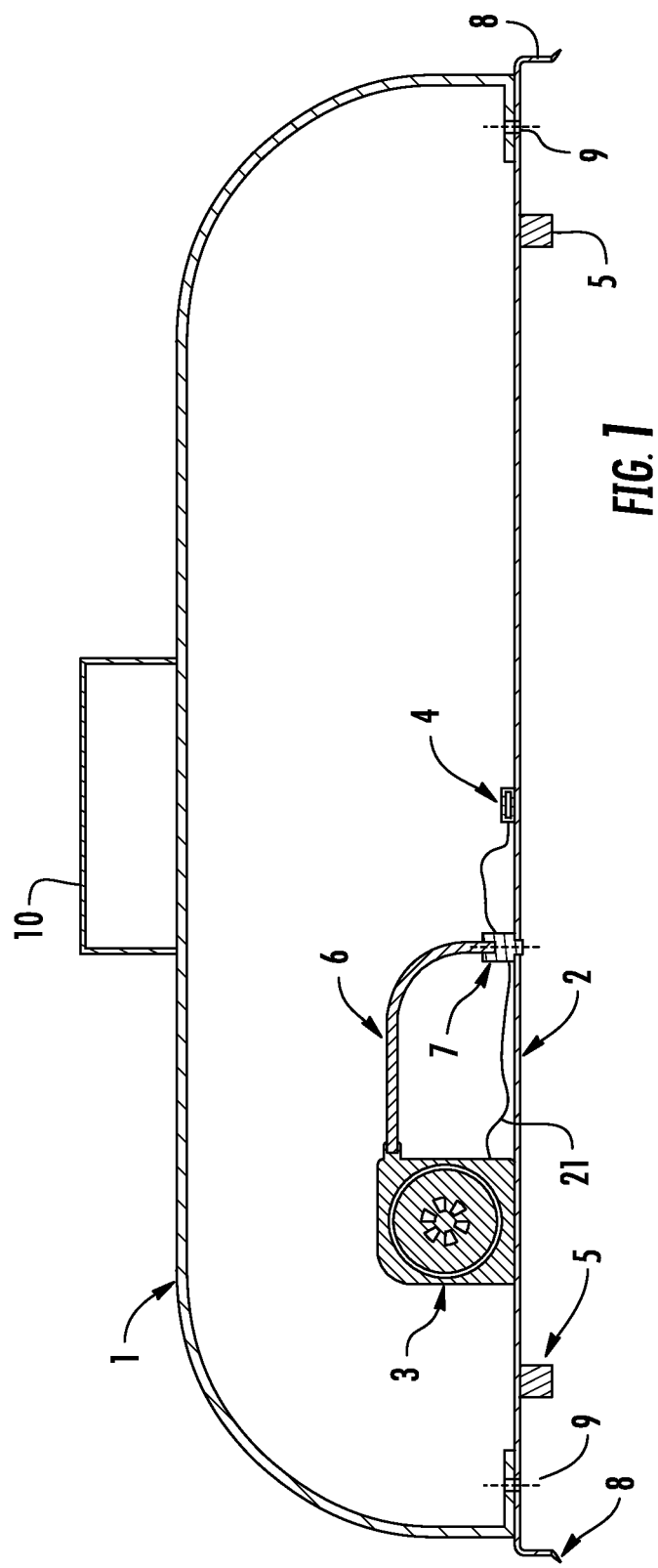
FIG. 1 shows a cross-sectional view of the vehicle-roof mounting-base being used to support a sign.

FIG. 1 shows a cross section of the present invention supporting a sign 10. The present invention has a case 1, a base 2, a vacuum pump 3, a vacuum sensor 4, a seal 5, vacuum tubing 6, a nozzle 7, a wire 21 to connect the vacuum sensor 4 to the vacuum pump 3, and a fastener 9 to connect the base 2 and the case 1. The base 2 may include an optional flange 8 (also known as a gimp), for decorative and/or protective purposes. The invention can be powered with a standard cigarette lighter power cable or similar device or accessory (not shown).

Figure 2:
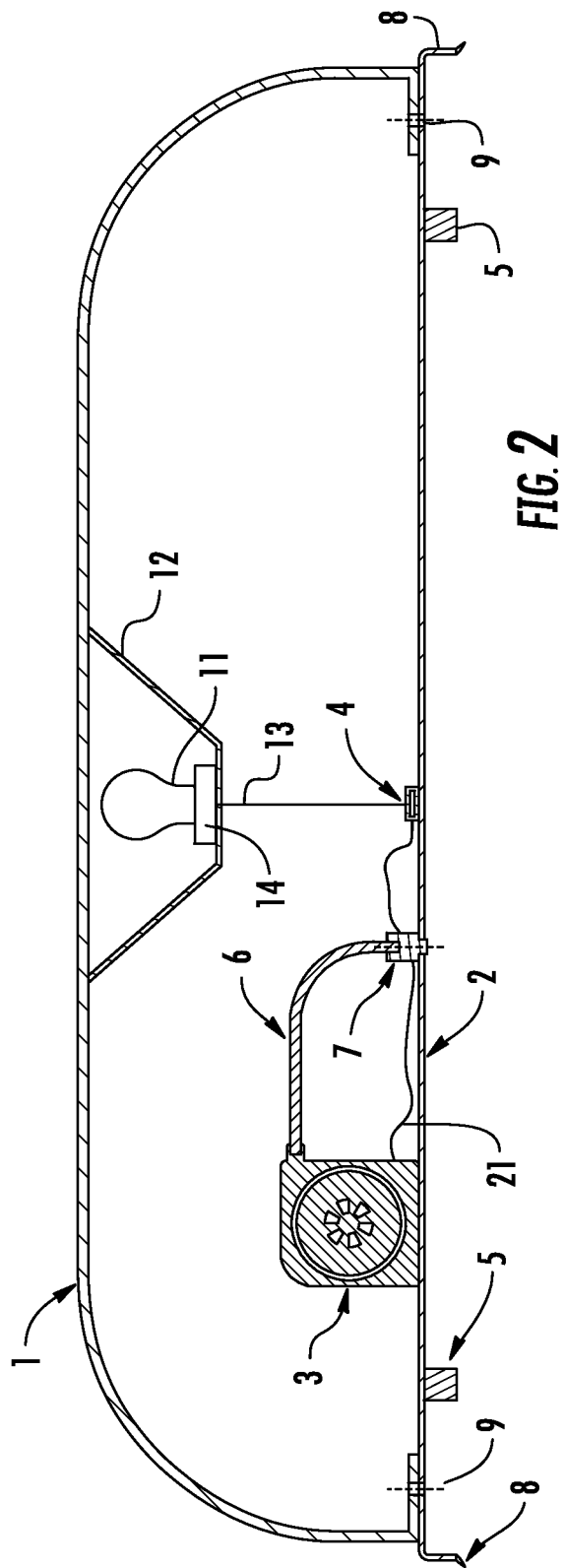
FIG. 2 shows a cross-sectional view of the vehicle-roof mounting-base being used to support a light.

FIG. 2 shows a cross section of the present invention supporting a light 11 assembly. The present invention has a case 1, a base 2, a vacuum pump 3, a vacuum sensor 4, a seal 5, vacuum tubing 6, a nozzle 7, a wire 21 to connect the vacuum sensor 4 to the vacuum pump 3, and a fastener 9 to connect the base 2 and the case 1. The base 2 may include an optional flange 8, for decorative and/or protective purposes. The invention can be powered with a standard cigarette lighter power cable or similar device or accessory (not shown). The light 11 assembly is comprised of at least one light 11, at least one socket 14, a housing 12, and a power connection 13. When the present invention is used with a light 11 assembly, the case 1, or part of the case 1 (a lens), can be constructed from a clear or transparent material such as PC, PMMA, or other generic or brand-name clear or semi-transparent plastic.

The base 2 may be either planar or a curved surface, fabricated from PMMA, PC, ABS, steel, or aluminum. The case 1 is fabricated for both decorative and protective purposes. Depending on the use, the case 1 is made from a durable polymer such as ABS, PP, PMMA, PC, HDPE, or LDPE. In lighting applications, the case 1 can include a lens fabricated from PC (Lexan®) or PMMA (Plexiglass), or the case 1 can integrally be made out of PC (Lexan®) or PMMA (Plexiglass), thus integrating the case 1 into the lighting application.

The impermeable seal 5 is continuous, and is fabricated from silicon, butyl rubber, nitrile rubber, or closed-cell foam. Depending on the roof contour of the application, and the base 2 contour, the seal 5 may need to be of compound construction. A compound seal 5 would have an upper part fabricated from a durable material, such as ABS, PP, PMMA, PC, HDPE, LDPE, steel, or aluminum. The lower part of a compound seal 5 is made of gas impermeable silicon, butyl rubber, nitrile rubber, or closed-cell foam. The seal 5 is attached to the base 2 with an adhesive, welding, or other gas impermeable attaching means. The seal 5 dimensions are dependent on the application and the material. A quick sealing material, such as silicon, should be used for a seal 5 used to mate the base to a roof with ridges.

The vacuum assembly is comprised of a vacuum pump 3, a vacuum hose 6, a vacuum sensor 4, a nozzle 7, a wire connecting the vacuum pump 3 and the vacuum sensor 4, and a power supply cable (not shown). The vacuum pump 3 is a traditional low-cost, dry, constant displacement pump that exhausts to atmospheric pressure. Typically, the vacuum pump 3 will be made of rotary vane, or diaphragm construction. The vacuum hose 6 is made from standard flexible automotive vacuum hose materials such as neoprene, silicon, HDPE, and flex steel. When the vacuum hose 6 is made from neoprene, silicon, HDPE, or LDPE, it is reinforced with fibers made from polyester or other suitable material. The vacuum sensor 4 can be either a low-cost differential pressure sensor and the associated circuitry, or a pressure switch calibrated to close when the pressure in the enclosed volume exceeds the pre-defined retention pressure. The nozzle 7 is a one-way gas valve of typical construction.

Figure 3:
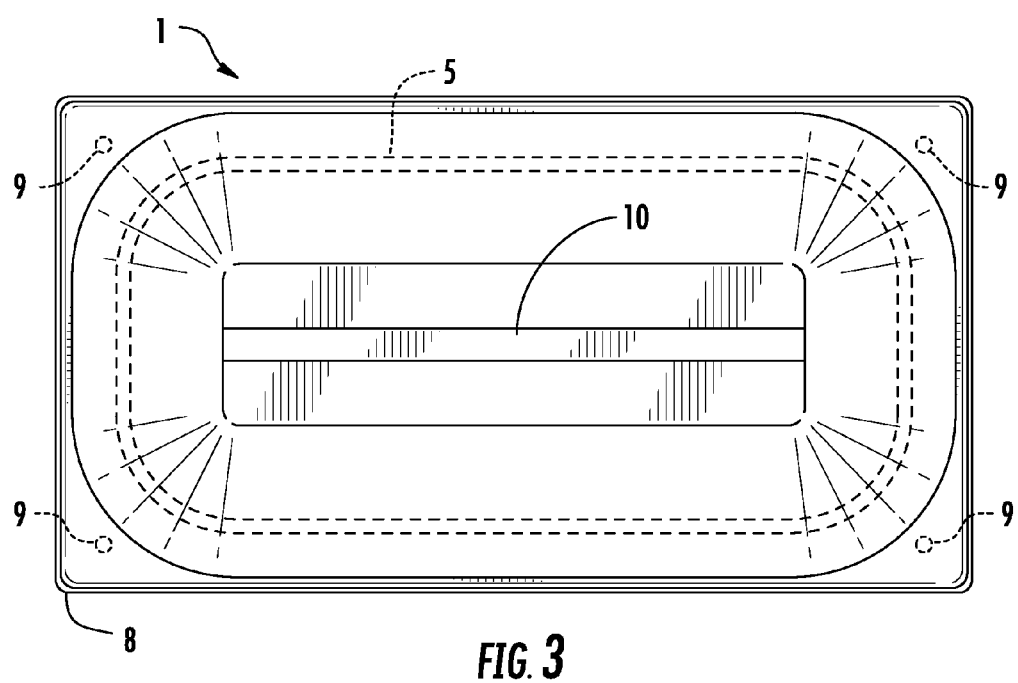
FIG. 3 shows a top view of a vehicle-roof mounting-base being used to support a sign.

FIG. 3 shows a top view of the present invention, used as a sign 10 base. The case 1 and sign 10 are visible. There is a flange 8 around the perimeter of the base 2 that is both decorative and functional. The flange 8 can be decorative and minimizes environmental exposure to the seal 5. The fasteners 9 holding the case 1 to the base 2 are visible. Other fastening methods are possible, such as adhesives or welding.

Figure 4:
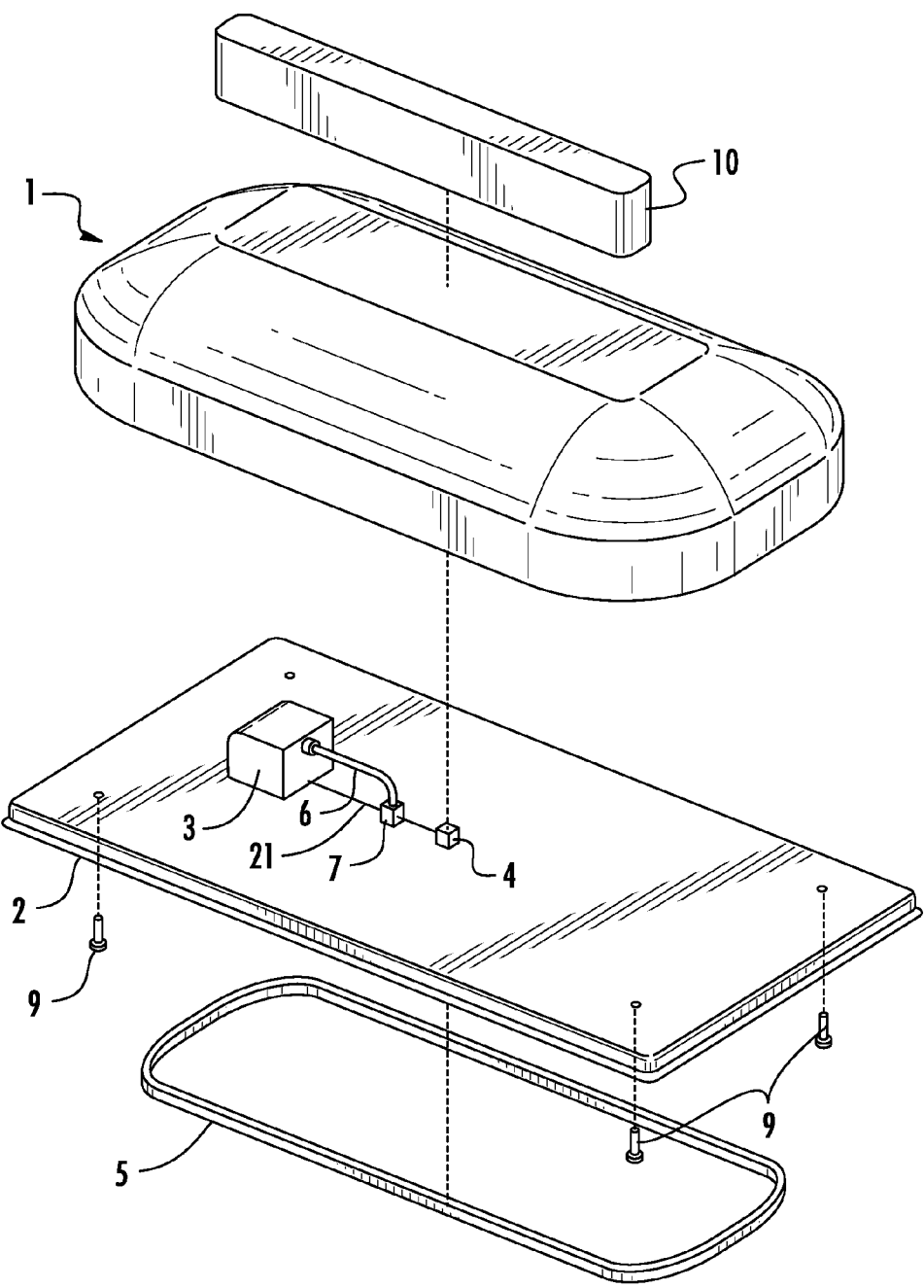
FIG. 4 shows an exploded isometric view of the vehicle-roof mounting-base being used to support a sign.

FIG. 4 shows an exploded isometric view of the present invention, used as a sign 10 mounting base. The seal 5 is connected to the bottom of the base 2 with adhesive, welding, or other gas impermeable attaching means. Other fastening methods, such as plasma discharge or foam-in-place can be used, depending on the gas impermeable material used for the seal 5. The vacuum assembly is attached to the base 2. The vacuum assembly includes the vacuum pump 3, the vacuum tube 6, the nozzle 7, a vacuum sensor 4, and a wire 21 connecting the vacuum sensor 4 to the vacuum pump 3. The base 2 is fastened to the case 1 with fasteners 9 that are inserted into through-holes from the bottom of the base 2.

Figure 5:
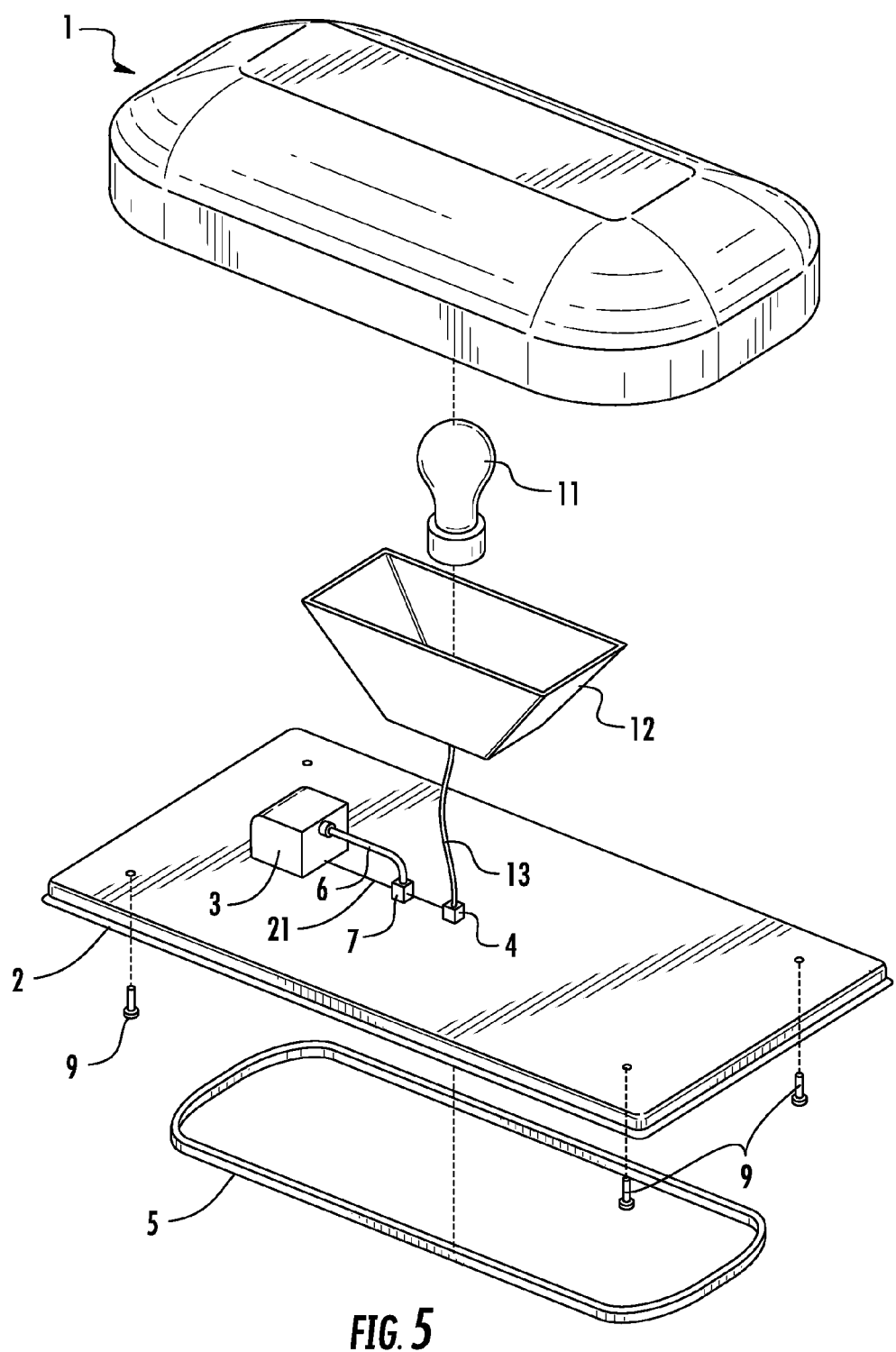
FIG. 5 shows an exploded isometric view of the vehicle-roof mounting-base being used to support a light.

FIG. 5 is an exemplary exploded isometric view of the present invention, used as a light 11 mounting base. The light 11 assembly includes a light bulb 11, a socket 14, a housing 12, and a wire 13 powering the light 11. When used for a lighting application, the case 1 is to be constructed from a transparent material such as PC or PMMA.

We claim:

1. A vehicle-roof mounting-base comprising, a rigid base; a case; a continuous gas impermeable seal; a vacuum pump; a vacuum sensor; a vacuum nozzle; and a means for powering the vacuum pump; wherein, when the vehicle-roof mounting-base is placed on the roof of a vehicle, the vacuum pump can partially evacuate, through the vacuum nozzle, an enclosed volume defined by the roof, the bottom of the rigid base, and the continuous gas impermeable seal, thus creating sufficient retention force to adhere the vehicle-roof mounting-base to the vehicle roof.

2. The invention in claim 1, wherein the rigid base is constructed from ABS, PMMA, PC, steel, or aluminum.

3. The invention in claim 1, wherein the case is constructed from ABS, PMMA, PC, PP, HDPE, or LDPE.

4. The invention in claim 1, wherein the continuous gas impermeable seal is fabricated, in whole or in part, from silicon, butyl rubber, nitrile rubber, or closed-cell foam.

5. The invention in claim 1, wherein the continuous gas impermeable seal is of compound construction, wherein an upper portion, in intimate contact with the lower surface of the base, is constructed from ABS, PMMA, PC, PP, HDPE, LDPE, steel, or aluminum; and a lower portion, fused, attached, or adhered to the upper portion, is constructed from silicon, butyl rubber, nitril rubber, or closed-cell foam.

6. The invention in claim 1, wherein the vacuum pump is a displacement pump.

7. The invention in claim 6, wherein the displacement pump is of rotary vane or diaphragm construction.

8. The invention in claim 1, wherein the vacuum sensor is comprised of a pressure switch.

9. The invention in claim 1, wherein the vacuum sensor is comprised of a differential pressure sensor.

10. The invention in claim 1, further comprising a vacuum hose.

11. The invention in claim 1, wherein the vehicle-roof mounting-base is used to mount a sign on top of a vehicle roof.

12. The invention in claim 1, wherein the vehicle-roof mounting-base is used to mount a light on top of a vehicle roof.

13. The invention in claim 12, wherein the vehicle-roof mounting-base is used to support a lightbar, wherein the lightbar is attached, externally, to the top of the case, and wherein the lightbar contains a one or more lighting elements.

14. The invention in claim 12, wherein the vehicle-roof mounting-base contains a light assembly, internal to the case, wherein the case is, at least partially, fabricated from a transparent material; and wherein said light assembly comprises one or more lighting elements.

* * * * *